US012498688B2

(12) United States Patent
Wilson et al.

(10) Patent No.: US 12,498,688 B2
(45) Date of Patent: Dec. 16, 2025

(54) SMART POWERED INDUSTRIAL VEHICLE AND SYSTEMS

(71) Applicant: NEW SOUTH EXPRESS, LLC, Lincoln, AL (US)

(72) Inventors: Scott Wilson, East Liberty, OH (US); David Zavala, East Liberty, OH (US); Minamikawa Mashiko, East Liberty, OH (US)

(73) Assignee: NEW SOUTH EXPRESS, LLC, Lincoln, AL (US)

( * ) Notice: Subject to any disclaimer, the term of this patent is extended or adjusted under 35 U.S.C. 154(b) by 491 days.

(21) Appl. No.: 18/050,668

(22) Filed: Oct. 28, 2022

(65) Prior Publication Data

US 2023/0139590 A1 May 4, 2023

Related U.S. Application Data

(60) Provisional application No. 63/273,570, filed on Oct. 29, 2021.

(51) Int. Cl.
*G05B 19/042* (2006.01)
*B66F 9/075* (2006.01)
*B66F 9/24* (2006.01)

(52) U.S. Cl.
CPC ............ *G05B 19/042* (2013.01); *B66F 9/075* (2013.01); *B66F 9/24* (2013.01); *G05B 2219/2641* (2013.01)

(58) Field of Classification Search
CPC .......... G05B 19/042; G05B 2219/2641; B66F 9/075; B66F 9/24
See application file for complete search history.

(56) References Cited

U.S. PATENT DOCUMENTS

| | | | | |
|---|---|---|---|---|
| 5,586,620 | A * | 12/1996 | Dammeyer | B66F 9/122 414/641 |
| 2002/0176771 | A1* | 11/2002 | Ando | B66F 9/0755 414/718 |
| 2018/0120465 | A1* | 5/2018 | Rose | B66F 9/063 |
| 2020/0239242 | A1* | 7/2020 | Hoofard | B65G 67/24 |
| 2020/0319613 | A1* | 10/2020 | Pappas | G05B 19/042 |
| 2023/0110512 | A1* | 4/2023 | Koide | B66F 9/0755 414/722 |
| 2023/0229178 | A1* | 7/2023 | Kubotani | G05D 13/66 701/93 |
| 2023/0348249 | A1* | 11/2023 | Li | G05D 1/0227 |

* cited by examiner

*Primary Examiner* — Michael W Choi
(74) *Attorney, Agent, or Firm* — Vorys, Sater, Seymour and Pease LLP; Rex W. Miller, II

(57) ABSTRACT

Disclosed herein are features and improvements for a powered industrial vehicle, such as a forklift. In some embodiments, the forklift may have improved geometry and sensors. In some embodiments, the forklift may include an operator interface system for controlling powered industrial vehicles based on the field of view of an operator. In some embodiments, the forklift may include an integrated control system such that the operator cannot perform a certain operation without first performing a different, prior operation and/or such that the operator cannot perform two or more operations simultaneously which would result in unsafe operation. In some embodiments, a virtual reality simulator for the forklift may be provided.

10 Claims, 7 Drawing Sheets

SMART POWERED INDUSTRIAL VEHICLE AND SYSTEMS

BACKGROUND

This application claims priority to U.S. Provisional Patent Application No. 63/273,570, filed on Oct. 29, 2021, titled Smart Powered Industrial Vehicle and Systems, the disclosure of which is incorporated here by reference.

BACKGROUND

Current fork designs for powered industrial vehicles and material handling equipment, e.g., a forklift, such as those utilized in a warehouse, allow one or more tines of the fork to strike a pallet while the fork is in a tilt position. In this way, many pallets are damaged when the forks on forklift devices strike the pallet, resulting in shorter useful life of the pallet. The width and slight curving of current forklift tips are also unforgiving when the fork hits the side of a pallet pocket, e.g., a fork pocket, potentially causing additional damage. Damage to the structural integrity of pallets increases the risk of damage to the goods and injury for those working in the warehouse. If a damaged pallet is stored in a rack, there is an additional risk that the pallet may fall during unloading.

Another characteristic of the forklift is instability. The forklift and its load should be considered a unit having a continually varying center of mass that varies with every movement of the load. A forklift should never negotiate a turn at speed with a raised load, where centrifugal and gravitational forces may combine to cause a disastrous tip-over accident. Forklifts are a critical element of warehouses and distribution centers. It is imperative that these machines be designed for efficient and safe movement.

SUMMARY OF DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

The new design fork allows the fork to gently ride over the lip of the pallet for easier fork pocket entry to help eliminate pallet damage. Thus, the new fork design limits the fork's ability to damage the fork pocket and extends the pallet life span.

Presently disclosed is a tine for a powered industrial vehicle. In an embodiment, the tine includes a bottom surface; a top surface having a first length; a bevel portion having a second length, wherein the bevel portion is to couple the bottom surface and the top surface and wherein the second length is a multiplier of the first length; and a cavity disposed between the bottom surface and a tip formed by a juncture of the bevel portion and the top surface, wherein the cavity is configured to receive at least one sensor. In some embodiments, the multiplier is between 0.10 and 0.20. In some embodiments, the bevel portion is to couple the bottom surface and the top surface in a substantially linear manner. In some embodiments, the bevel portion has a degree of curvature. In some embodiments, an angle of a juncture of the bevel portion and the bottom surface is an obtuse angle, and the angle may be between 140 degrees and 170 degrees, between 155 degrees and 160 degrees, or between 145 degrees and 170 degrees. In some embodiments, a tip formed by a juncture of the bevel portion and the top surface has a first radius in vertical direction and a second radius in a horizontal direction. In some embodiments, the first radius is less than the second radius. In some embodiments, one or more of the first radius and the second radius is a variable radius associated with an ellipsoidal shape. In some embodiments, one or more of the first radius and the second radius is a constant radius associated with a rounded shape. In some embodiments, the first radius is a second multiplier of the second radius, and the second multiplier is no more than ⅓, no more than ¼, or no more than ⅕. In some embodiments, the constant radius is between 0.1 inches to 1 inch or between 0.2 inches to 0.5 inches. In some embodiments, a tip formed by a juncture of the bevel portion and the top surface is substantially trapezoidal in shape in a horizontal direction that is substantially parallel with the top surface. In some embodiments, the tip has a first radius in a vertical direction and a smaller end of the trapezoidal shape has a second radius in the horizontal direction, and wherein the first radius is less than the second radius. In some embodiments, the tine comprises a coating configured to absorb a shock of striking a pallet, and the coating may be a plastic or elastomeric coating. In some embodiments, the coating is approximately 25 millimeters or less. In some embodiments, the cavity is disposed within the bevel portion. In some embodiments, the at least one sensor is coupled to an internal wall of the cavity using one or more fasteners. In some embodiments, the at least one sensor is sealed within the cavity.

Also disclosed is a smart fork system for a powered industrial vehicle. In an embodiment, the smart fork system includes a tine comprising at least one cavity, wherein a sensor is disposed within the at least one cavity; and a processor communicatively coupled to the sensor, wherein the processor is to: receive data from the sensor; and in response to the data, control at least one operation of the powered industrial vehicle. In some embodiments, the sensor is configured to detect one or more motions, one or more orientations, one or more impacts, one or more environmental conditions, or a combination thereof. In some embodiments, the sensor is configured to: detect a condition; and in response to the condition, control a switch, wherein the switch is configured to activate or deactivate a circuit or device of the powered industrial vehicle. In some embodiments, the processor is further configured to store the data to a storage device. In some embodiments, the processor is configured to: determine, based on the data, that an impact has occurred; and in response to the determination of the impact, control a forward extension of the tine, a forward movement of the powered industrial vehicle, an alarm, a communication, or a combination thereof. In some embodiments, the system further includes a second sensor coupled to a second component of the smart fork system, and the processor is further configured to: receive a second set of data from the second sensor; and store the first set of data of the first sensor and the second set of data of the second sensor to a storage device. In some embodiments, the processor is configured to: determine, based on the first set of data, the second set of data, or a combination thereof, a location of the powered industrial vehicle within an environment; and control, based on the location, the at least one operation of the powered industrial vehicle. In some embodiments, the at least one operation is a speed of the powered industrial vehicle, a position of the tine, a forward or backward movement of the powered industrial vehicle, a tilt of a mast of the powered industrial vehicle, an alarm or communication system of the powered industrial vehicle, or a combination thereof. In some embodiments, the second component is a second tine, a mast, a frame, a carriage, a counterweight, an overhead guard, a cab, a power source, or an axle. In some embodiments, at least one of the first sensor or the second sensor is a gravity sensor, an accelerometer, a gyroscope, a tilt sensor, a Global Positioning System (GPS) sensor, a position sensor, a proximity sensor, a vibration sensor, a shock and impact sensor, a velocity or speed sensor, a weight or load sensor, an optical sensor, or a force sensor. In some embodiments, at least one of the first sensor or the second sensor is an image sensor, an object detection sensor, or a camera. In some embodiments, at least one of the first sensor or the second sensor is configured to measure a temperature, a humidity, a luminosity, or an atmospheric pressure.

Also disclosed is a method for safely operating a powered industrial vehicle. In an embodiment, the method includes determining a location of the powered industrial vehicle; in response to the location indicating a first zone, controlling a first set of operations of the powered industrial vehicle; and in response to the location indicating a second zone, controlling a second set of operations of the powered industrial vehicle. In some embodiments, the second set of operations includes a subset of the first set of operations. In some embodiments, at least one of the first set of operations or the second set of operations includes at least one of activating or deactivating a circuit or device of the powered industrial vehicle, controlling a position of one or more tines of the powered industrial vehicle, controlling a forward or backward movement of the powered industrial vehicle, controlling a speed of the powered industrial vehicle, controlling a tilt of a mast of the powered industrial vehicle, controlling an alarm or a communication system of the powered industrial vehicle, or a combination thereof. In some embodiments, controlling the first set of operations further includes determining a position of the one or more tines, an orientation of the one or more tines, a weight of a load carried by the one or more tines, or a combination thereof; and in response to a determination that the position, the orientation, the weight, or the combination thereof, indicates an unsafe condition, inhibiting the movement of the powered industrial vehicle. In some embodiments, the method further includes reducing a speed of the powered industrial vehicle to inhibit the movement of the powered industrial vehicle; in response to a determination that the position indicates an unsafe condition, modifying the position so that the one or more tines are in a lowered position proximate to the ground or in a raised position that does not obstruct a field of view of an operator of the industrial powered vehicle; and in response to a determination that the orientation indicates an unsafe condition, modifying the orientation so that a tilt of a mast of the powered industrial vehicle is within a specified range of tilt angles. In some embodiments, controlling the first set of operations further includes reducing a speed of the powered industrial vehicle to inhibit the movement of the powered industrial vehicle; in response to a determination that the weight exceeds a specified threshold and a determination that the position exceeds a specified threshold height, modifying the position so that the one or more tines are in a lowered position that is below the specified threshold height; and in response to the determination that the weight exceeds the specified threshold and a determination that the orientation is outside a specified range of tilt angles, inhibiting the movement of the powered industrial vehicle. In some embodiments, controlling the second set of operations further includes increasing the speed of the powered industrial vehicle. In some embodiments, controlling the second set of operations further includes reducing the speed of the powered industrial vehicle. In some embodiments, the method further includes determining an environmental condition within the first zone or the second zone; in response to the environmental condition indicating a high obstruction, modifying a position of one or more tines of the powered industrial vehicle; and in response to the environmental condition indicating a turn or a hazardous area, reducing a speed of the powered industrial vehicle, modifying the position of the one or more tines, modifying an orientation of the one or more tines, or a combination thereof. In some embodiments, the method further includes determining a stability of the powered industrial vehicle; determining the first set of operations of the powered industrial vehicle based on the stability; and determining the second set of operations of the powered industrial vehicle based on the stability. In some embodiments, the stability includes one or more of a lateral stability, a longitudinal stability, or a dynamic stability.

Also disclosed is an operator interface system for a powered industrial vehicle. In an embodiment, the operator interface system includes one or more sensors coupled to a frame of the powered industrial vehicle; and a processor, wherein the processor is configured to: determine, based on data of the one or more sensors, a rotational position of an operator's head; and based on the rotational position of the operator's head, control a drive train, a power system, or a combination thereof, of the powered industrial vehicle. In some embodiments, the processor is configured to inhibit operation of the powered industrial vehicle in response to a determination that the rotational position of the operator's head is misaligned with a direction of travel of the powered industrial vehicle. In some embodiments, the operator interface system includes a sensing device to be worn by an operator, wherein the sensing device comprises a sensor configured to monitor an awareness of an operator, a health of an operator, a condition of an operator, or a combination thereof. In some embodiments, the sensor is a temperature sensor, a heart rate monitor, a timer, or a combination thereof. In some embodiments, the processor is configured to inhibit operation of the powered industrial vehicle in response to a determination that the sensing device is not worn by the operator. In some embodiments, the one or more sensors is an image sensor. In some embodiments, the processor is configured to: determine, based on the data of the one or more sensors, that an object is in a path of the powered industrial vehicle; and in response to the determination that the object is in the path, alert the operator, inhibit a movement of the powered industrial vehicle, notify a remote person, or a combination thereof. In some embodiments, the processor is configured to store the data of the one or more sensors, actions taken by the operator, or a combination thereof, to a storage device.

Also disclosed is an integrated control system for a powered industrial vehicle. In an embodiment, the integrated control system includes a status module for determining a status of at least one operational system of the powered industrial vehicle; and an order module for controlling one or more of the operational systems in response to the status. In some embodiments, the operational systems include at least one of a braking system, a drive system, a lifting system, a lighting system, or a combination thereof. In some embodiments, the status module is configured to receive data from one or more sensors of the powered industrial vehicle. In some embodiments, the one or more sensors are disposed within a cavity of a tine of the powered industrial vehicle, affixed to a frame of the powered industrial vehicle, worn by an operator of the powered industrial vehicle, or a combination thereof. In some embodiments, the order module is configured to inhibit a movement of the powered industrial vehicle in response to the status indicating a condition is unmet. In some embodiments, the condition includes at least one of an unengaged brake pedal of a braking system, an engaged throttle of a drive system, or a combination thereof. In some embodiments, the movement includes at least one of a position of one or more tines of a lifting system, an orientation of the one or more tines of the lifting system, a forward movement of the powered industrial vehicle, a rearward movement of the powered industrial vehicle, or a combination thereof.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
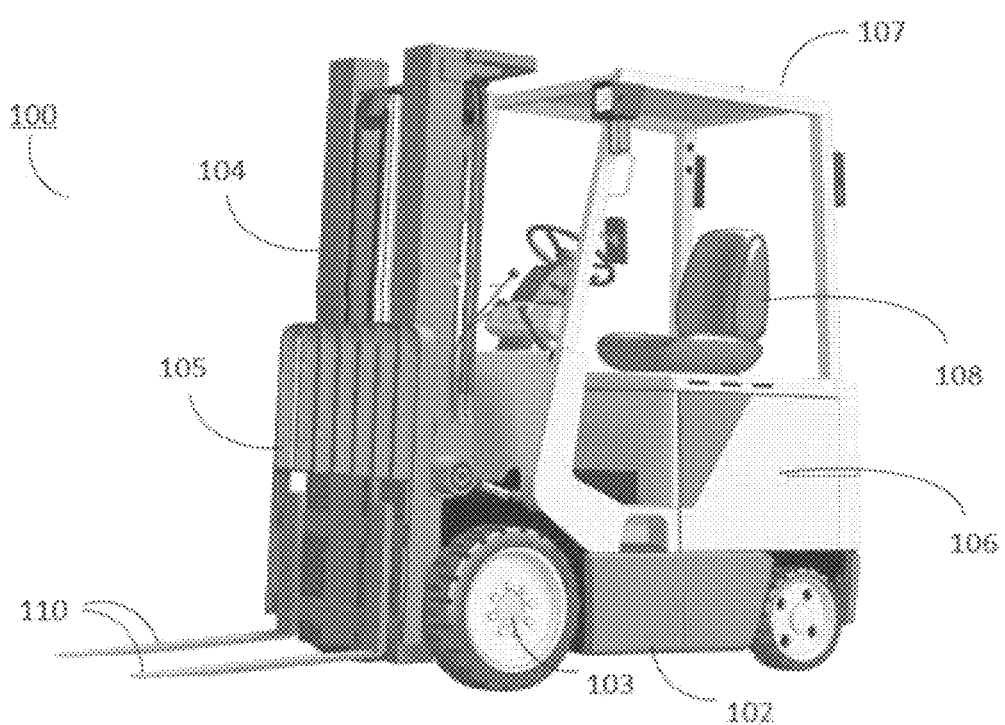
FIG. 1 illustrates a forklift.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the example embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, the terms "generally" and "substantially" are intended to encompass structural or numeral modification which do not significantly affect the purpose of the element or number modified by such term.

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number. The a range defined as "between" includes the endpoints of such range.

FIG. 1 illustrates a typical powered industrial vehicle, embodied as a forklift 100. Reference is made to this generalized forklift throughout this disclosure, however it is to be understood that the elements and components described herein may be substituted for similarly functioning components as known in the art. Generally, a forklift 100 is a powered industrial truck used to lift and move materials ("loads") over short distances. Depending on the size and arrangement (dimensions, shape, and weight) of the load, the load may be carried directly by a forklift, or the load may be placed on a pocketed pallet for which the forklift is configured to engage. Forklifts are rated for loads at a specified maximum weight and a specified forward center of mass. This information is located on a nameplate provided by the manufacturer, and loads should not exceed these specifications.

With continued reference to FIG. 1, forklifts 100 generally include a frame 102, which serves as the base of the industrial truck to which a mast 104, a carriage 105, a counterweight 106, an overhead guard 107, a power source (engine or batteries) and other components are attached.

The counterweight 106 is a heavy mass attached to the rear of the forklift truck frame 102. In electric forklifts, the battery power source may serve as part of the counterweight 106. The counterweight 106 compensates for the load carried by the forklift 100. That is, forklifts operate on the principle of a fulcrum where weight on the forks are to be counterbalanced by the counterweight and weight of the forklift. In most forklift designs, the fulcrum is the drive axle.

As mentioned, the forklift 100 may also include the mast 104 that does the work of raising and lowering the load and is mounted to the front axle 103 or frame 102 of the forklift. The mast 104 is typically composed of interlocking rails that also provide lateral stability. The interlocking rails may have either rollers or bushings as guides. The mast 104 may be driven hydraulically, and operated by one or more hydraulic cylinders directly or using chains from the cylinders. A carriage 105 is a component to which forks or other attachments mount. The carriage 105 is usually embodied as a substantially flat metal plate that is mounted into and moves up and down the mast 104 by means of chains or by being directly attached to a hydraulic cylinder. Like the mast 104, the carriage 105 may have either rollers or bushings to guide it in the interlocking mast rails. In addition to raising and lowering the carriage 105, the mast 104 can be tilted to angle the tines 110 for capturing, supporting and retaining a load.

During normal operation the tilt angle of the mast 104 may be limited to a predetermined value set by the manufacturer, the operator, or industry standards. The predetermined tilt angle may limit the movement of the mast to a degree considered appropriate for normal operations in order to prevent excessive tilt or excessive wear and tear on the forklift. For example, in some forklifts the predetermined tilt limit may be 6°. The tilt angle is measured relative to the vertical axis of the forklift. In some embodiments, the presently disclosed system includes a tilt control allowing the mast 104 to be tilted beyond the limit of a predetermined tilt value. For example, the mast 104 may be tilted to an angle of greater than 6°, greater than 9°, or greater than 12°. In some embodiments, the tilt control allows the mast 104 to tilted to a greater angle in order engage a pallet located on a non-level surface or on a surface that is offset from the surface on which the forklift is operated. In one example, a pallet on a trailer may be slightly higher or lower than the floor of a warehouse in which the forklift is operated. In order to engage the pallet on the trailer, a forklift operated on the warehouse floor may need to tilt the mast 104 beyond the normal limit to capture the pallet. In this manner, tines of the forklift may be better aligned with the pallet pocket thereby reducing damage. While allowing the mast 104 to tilt beyond normal limits, the tilt control may still be subject to limits for safety to prevent improper operation of the forklift. In various examples, the maximum tilt allowed by the tilt control may be no more than 10°, no more than 15°, or no more than 25° depending upon the application and the design of the forklift. In yet other embodiments, the tilt control may allow tilting of the mast up to the maximum range of the mast control.

The forklift 100 may also include the overhead guard 107 including a metal roof supported by a set of posts at each corner of the cab 108 where an operator may be seated. The overhead guard 107 protects the operator of the forklift 100 from falling objects and other environmental dangers. In some embodiments, the overhead guard is integrated as part of the frame 102. In some embodiments, the overhead guard comprises a domed structure of clear material, such that the operator has a full field of view when looking upward through the roof/overhead guard, and the overhead guard has a domed contour designed to allow falling objects to deflect outward from the cabin away from the operator.

Forklift Tine with Improved Geometry and Sensors

In accordance with one aspect of the present disclosure, disclosed is an improved tine for a forklift 100 that reduces potential damage to pallets and materials and provides a platform for incorporating at least one sensor and a "smart fork" system. It is to be appreciated that while the present application is described with reference to forklift tines, it should be appreciated that various aspects of the concept may be applied to other forms of lifting devices.

FIGS. 2A-2D illustrate various views of an example tine 200, according to one or more embodiments of the present disclosure. The tine 200 may be connected, as a set of two, to the carriage 105 of a forklift 100 for lifting and transporting loads. Each tine 200 is generally L-shaped including a vertically oriented shank 202 that connects the tine 200 to the carriage of a forklift. The connection of the shank to the carriage may be facilitated by mechanical fasteners and/or structures including hooks, pin locks, or any means known in the art to mechanically connect forklift attachments to the forklift carriage. Each tine 200 also includes a blade 204 that is substantially perpendicular to and connected to a bottom of the vertical shank 202 at a heel 206.

The blade 204 has a length L, width W, height H, and a substantially planar top surface 207 and bottom surface 205 opposite the top surface 207. A bottom surface of a load is configured to rest on and/or engage the top surface 207 of the blade 204. For example, a set of tines 200 are configured to engage complimentary shaped pockets of a pallet. As the tines 200 are lifted by raising the carriage 105, the top surface 207 of the blade 204 contacts the top inner surface of the pallet pocket and the pallet is raised under the control of an operator.

Figure 2A:
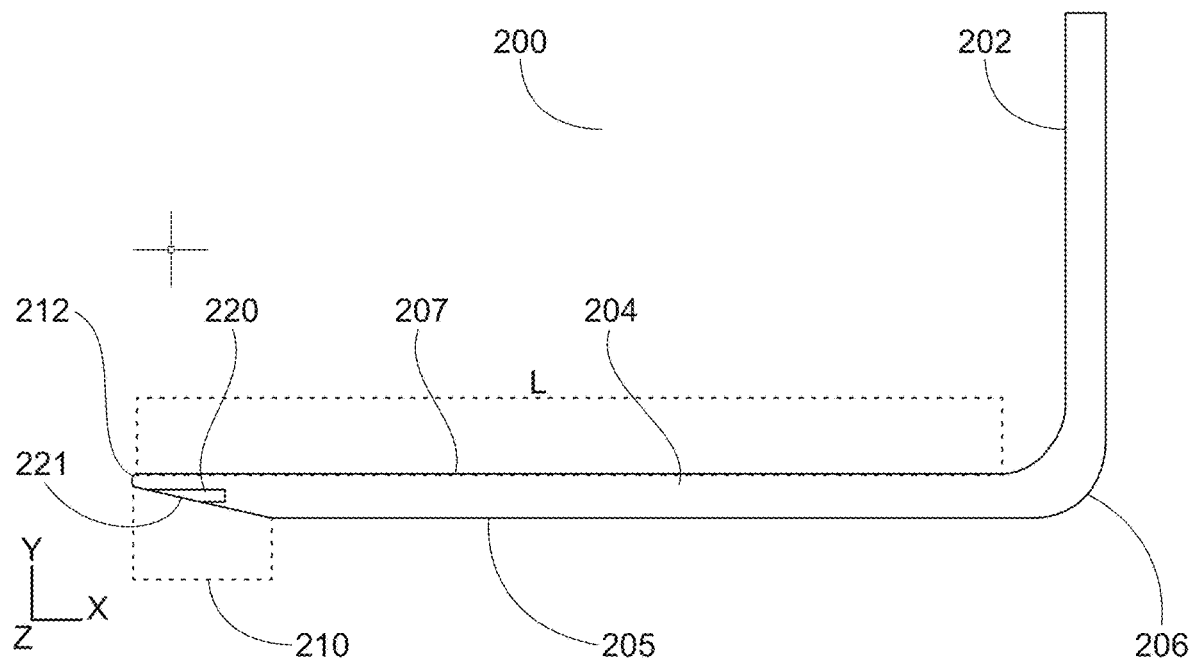
FIG. 2A is a side view schematic of an example forklift tine in accordance with the present disclosure.

The length L of the blades are longer than the height H and width W. The front distal end of the blade 204 includes a beveled portion 210 that connects and transitions the bottom surface 205 of the blade to the top surface 207 of the blade. The bevel portion 210 directly reduces the impact from striking the bottom of a container/pallet fork pocket, and further helps the tines to gently ride over a bottom lip of a pallet and enter the fork pocket easier to help reduce pallet damage. In some embodiments, the length P of the beveled portion 210 is about 10% to about 20% of the total length L of the blade. For example and without limitation, a blade 204 having a length L of about 39 inches includes a beveled portion 210 that is about 6 inches in length. In some embodiments and as illustrated in FIG. 2A the beveled portion 210 connects the bottom surface 205 to the top surface 207 in a substantially linear manner. In these embodiments, the angle α created between the bevel portion 210 and bottom surface 205 ranges from about 170 degrees to about 140 degrees. In some further embodiments, the angle α is about 155 to about 160 degrees including about 157 degrees. In some examples, the angle α is about 145 to 170 degrees. Providing the angle α at such measurements will ensure the leading edge of the fork does not strike the base of the fork pocket and thereby extend the useful life of the fork pocket and hence the useful life of the pallet. In other non-illustrated embodiments, the beveled portion 210 connects the bottom surface 205 to the top surface 207 in a non-linear manner, e.g., the beveled portion 210 exhibits some degree of curvature.

In some embodiments, a control system for controlling the forks or tines 200 of the forklift 100 may have various tilt settings. For example, a tine/fork control system may have two (2) or more tilt settings, such as the following: (i) a pallet protection setting; and (ii) full tilt setting. In the foregoing example, the pallet protection tilt setting may be operable to restrict the forward tilt such that a degree of tilt angle (e.g., a 5 degree angle) separates the leading end of the fork with a flat surface when tilt is full engaged; which would allow the bottom of the tine 200 to ride over the base of the pallet pocket without hitting the base of the pallet pocket directly, and which would thereby extend the life of the pallet pocket and thus extends the life of the pallet. Also in this example, the full tilt setting may be operable to allow the leading end of the tine 200 to make contact with a flat surface as per normal fork trucks 100. Where utilized, such a fork control system may be controlled/manipulated via controls (e.g., a switch on the fork truck dashboard within the cab 108).

The tines 200 may also include a rounded tip 212 at the front most distal end of the blade 204 configured to engage the pocket of a pallet. The round tip 212 is designed to reduce the pallet/container damage when the tip of the blade 204 contacts a surface of the pallet/container outside of its fork pocket. In this way, the tine 200 is more forgiving to a plastic container in case an operator misjudges the fork pocket during the material handing process.

Figure 2B:
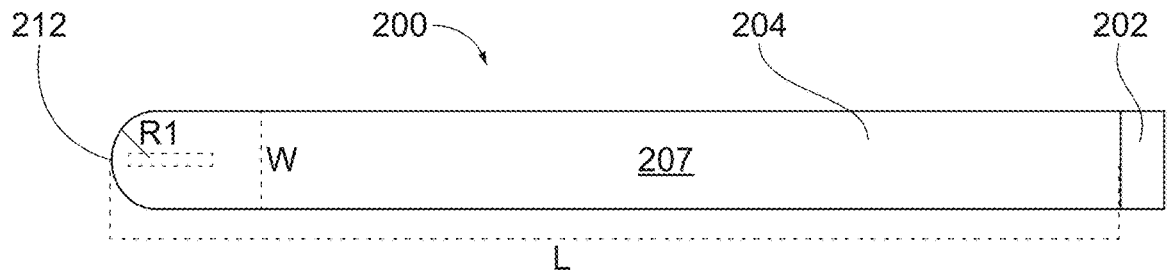
FIG. 2B is a top view of the example tine of FIG. 2A.

The rounded tip 212 is rounded in both the vertical direction (y-axis) and horizontal direction (x-axis). In the horizontal direction, the tip 212 is continuously arcuate at the distal end across the width W of the blade. That is, when viewed from the top, as illustrated in FIG. 2B, the tip 212 is substantially convex in a plane substantially parallel with the top surface 210. In some embodiments and as illustrated, the tip 212 exhibits a constant radius R1 in the x-z plane across the width W of the blade. For example and without limitation, a 4-inch wide blade has a first tip radius R1 of about 2 inches. However, it is to be appreciated that the curved tip may also have a variable radius R1, such that the resulting top-view profile of the tip 212 is ellipsoidal. Alternatively, the curved tip may be trapezoidal in shape when evaluated in the plane illustrated in FIG. 2B. For example, a larger base of the trapezoid may be 100 millimeters (mm) in width and a smaller base of the trapezoid may be 50 mm in width, and with the distance between the smaller and larger bases (e.g., the sides of the trapezoid) being 50 mm. Providing the curved tip with radius R1 swept back as such softens the entry to the fork pocket to extend the life of the side of the fork pocket and hence the useful life of the pallet.

The tip 212 is also rounded in the vertical direction. As illustrated in FIGS. 2A and 2D the tip 212 is rounded in the vertical direction and connects the beveled portion 210 to the top surface 207. The vertically rounded tip 212 has a continuous curvature in the y-direction with a radius R2 that is less than R1. In some embodiments, the radius R2 is constant, exhibiting a semi-circular cross section (see side view of FIG. 2D). The radius R2 is from about 0.1 inches to about 1 inch. In further embodiments, the radius R2 is about 0.2 inches to about 0.5 inches, including about 0.250, 0.275, 0.3, 0.325, 0.035, 0.375, 0.4, 0.425, 0.045, and 0.475. In other embodiments, the radius R2 is variable, exhibiting an ellipsoidal cross-section. In some embodiments, the bevel portion 210 is substantially tangent to the rounded tip 212. In one example where both R1 and R2 are of constant radii, R2 may be at most ⅓, or ¼, or ⅕ of R1

In some embodiments and with particular reference to FIG. 2D, the tine 200 is coated with a plastic or elastomeric coating 225 configured to absorb the shock of hitting a pallet. The coating may be applied by methods known in the art including but not limited to dip coating and spray coating. In some embodiments, only the blade 204 is coated with the coating 225 as the blade 204 and primarily, the tip 212, come in contact with a load, e.g., a pallet. In some examples, the coating 225 is up to 25 mm thick and can also serve to improve contact with the pallet to prevent pallets from slipping from the fork as may otherwise occur when bare metal forks pick up bare metal pallets. The coating 225 may also act to prevent wear on the fork. For example, oftentimes forks may be disposed of when they reach 10% wear, but providing the coating 225 as described herein may allow for refurbishment of the fork by recoating the surface. An initial coat of a different color to the bottom of the tine 200 may be utilized and act as a wear bar or gauge for notifying the fork owner when the fork needs to be recoated.

Figure 2C:
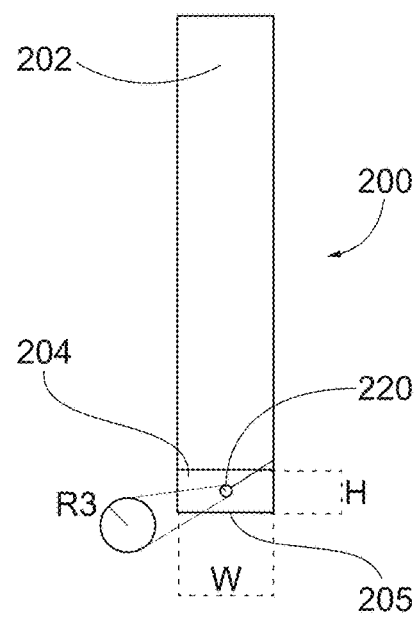
FIG. 2C is a front view of the example tine of FIG. 2A.
Figure 2D:
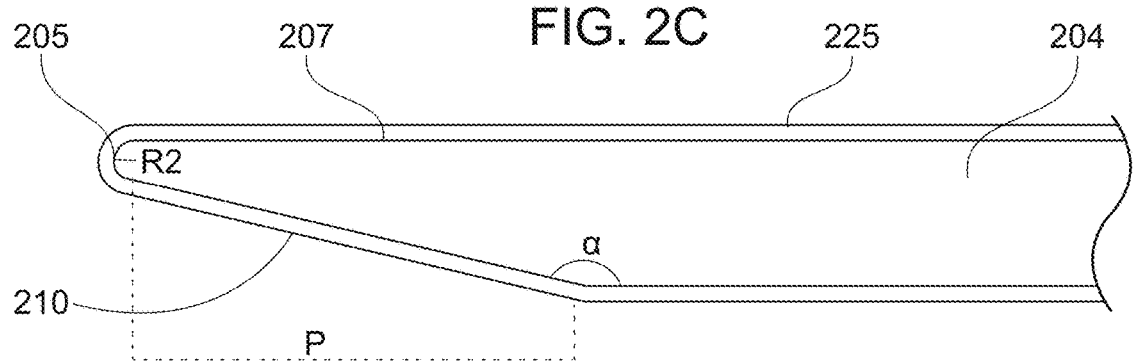
FIG. 2D is a close-up view of the tip of the example tine of FIG. 2A.

With reference to FIGS. 2A and 2C, the tine 200 may also include a cavity 220 with an open end 221 of the cavity 220 at a distal portion of the blade 204 and extending toward the heel 206. In some embodiments and as illustrated, the cavity 220 is located between the rounded tip 212 and bottom surface 205. In some embodiments, the cavity 220 is located in the beveled portion 210. The cavity 220 may be positioned within the center of the width W of the blade 204. However, the central placement of the cavity 220 is not limiting, as the placement of the cavity may be off-center along the width W. The cavity 220 may also be variously embodied, for example and without limitation, as a cylindrical bore having a constant or variable radius R3, a rectangular bore, and an irregular shaped hole.

Figure 3:
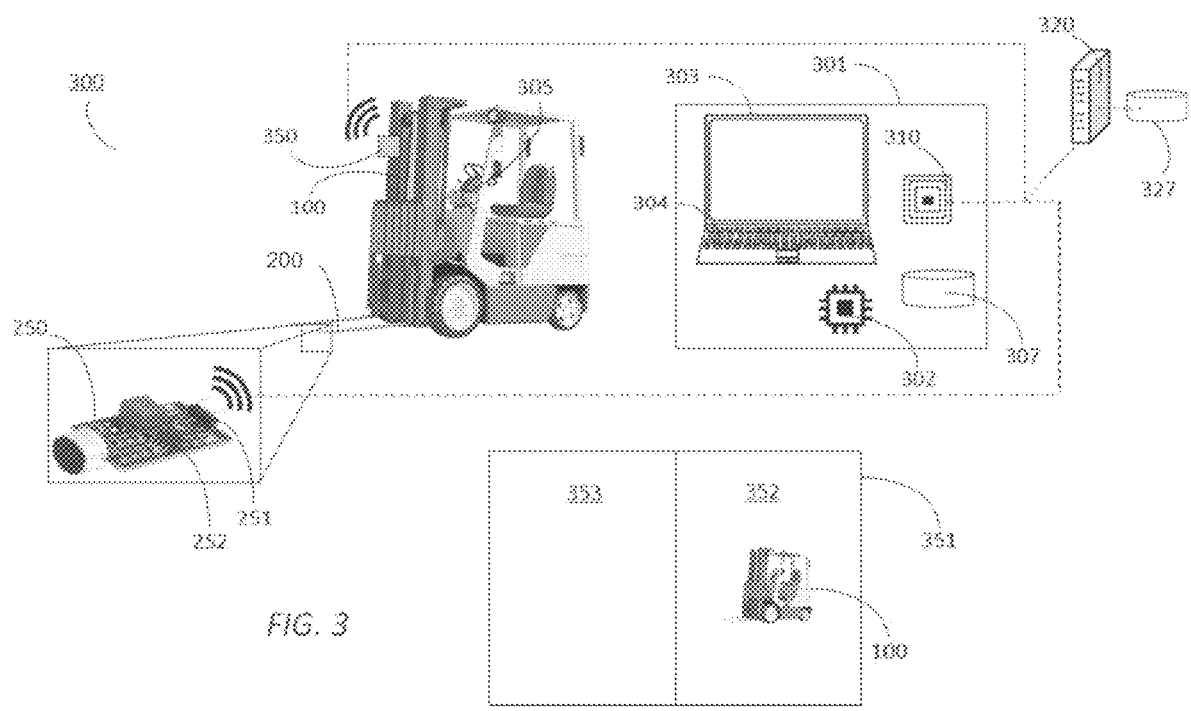
FIG. 3 is a schematic illustration of an example smart fork system in accordance with the present disclosure.

With reference to FIGS. 2A, 2C and 3, the cavity 220 is configured to receive and secure at least one sensor 250 to the blade 204. The sensor 250 may be held in place by fasteners, and the sensor 250 may be sealed (waterproof) within the cavity 220 and protected by a cover held by side fasteners. Such fasteners may include mechanical fasteners, such as bolts, or mating grooves or snaps, or adhesives, etc.

The sensor 250 is in communication with a central computer system 301 of the forklift 100 described in greater detail below. The sensor 250 may be a wireless sensor in wireless communication with the central computer system 301 or may be a wired sensor that is hard-wired with the central computer system 301 of the forklift 100. The sensor 250 is configured to detect, measure, and transmit the movement of the tine in any direction, including but not limited to acceleration, horizontal position, vertical position, tilt, rotation, or a combination thereof. In some embodiments, the sensor 250 is configured to measure impact, e.g., when the tine strikes a portion of a pallet. The data collected by the sensor 250 could be shared with the industry to make a healthier environment by reducing waste due to forklift operation abuse. The data collected may also be shared with OSHA to understand forklift habits during a material handling process. The forklift habits may be specific as to individual forklift operators and/or specific as to a particular type of material handling equipment.

In accordance with another aspect of the present disclosure and with reference to FIG. 3, at least one tine 200 operatively connected to the forklift 100 may be configured as a "smart fork" system 300. That is, the at least one tine 200 includes a sensor 250 placed within the cavity 220 for acquiring data related to the environment, position, and functions of the forklift 100 allowing an operator to have greater control of the machine and providing the ability to monitor usage of the forklift 100.

The central computer system 301 is configured to receive data from at least one sensor, e.g., the sensor 250 positioned on the tine or other sensors 350 positioned in other locations on the forklift 100 including but not limited to the tines. In some embodiments, the central computer system 301 may be integrated in the forklift 100 and may also control operation of the forklift 100 and various functions (e.g., raise and lower loads) as well as control and communicate with other forklift systems and components. In some embodiments, the central computer system 301, or at least a portion of it, may be a system that is separate from the forklift 100 but may connect to and receive operational data from the forklift 100. For example, the central computer system 301 may be a remote device capable of receiving data from the sensor 250, 350 (e.g., the central computer system 301 may be a tablet or mobile computing device held by an operator on a job site).

The central computer system 301 may be variously embodied, without departing from the scope of the present disclosure, as an industrial computer 303, a personal computer, a tablet, a smartphone or other known device that hosts a software platform and/or application, and/or combinations thereof. The central computer system 301 includes a processor 302 that may be any of various commercially available processors. The processor 302 may be variously embodied, such as by a single-core processor, a dual-core processor (or more generally by a multiple-core processor), a digital processor and cooperating math coprocessor, a digital controller, or the like. The central computer system 301 also includes at least one user interface 304 and/or display configured to present sensor obtained data and execute related functions. The user interface 304 also allows a user to input commands into the central computer system 301 for monitoring and controlling the various components of forklift. In some embodiments, the central computer system 301 is in communication with a control panel 305 of the forklift 100, wherein the control panel 305 may control the forklift 100 and facilitate user input into the computer system 301. The central computer system 301 may also include a non-transitory storage medium 307. The non-transitory storage medium 307 may comprise a hard disk drive, a redundant array of independent disks (e.g., RAID array) or other magnetic storage medium; a solid state drive (SSD), flash memory or other electronic storage medium; an optical disk or other optical storage medium; various combinations thereof, and/or so forth. As mentioned briefly before, data collected by the sensor 250, 350 could be saved to the storage medium 307 and later shared with the industry or OSHA.

It will be appreciated that the central computer system 301 may be connected to a LAN (Local Area Network) and include any hardware, software, or combinations thereof, capable of implementing the systems and methods described herein. Suitable examples of such hardware include, for example and without limitation, processors, hard disk drives, volatile and non-volatile memory, a system bus, user interface components, display components, and the like. It will further be appreciated that multiple such devices may be used as the central computer 301 in accordance with the subject disclosure. The central computer system 301 may also include a computer communication interface 310 for communicating (wired or wirelessly) with a plurality of devices, including but not limited to the sensors 250, 350, to the forklift control panel 305, and/or to one or more remote devices such as a server 320.

Each sensor 250, 350 may include a communication interface 251. The communication interface 251 includes circuitry for transmitting collected sensor data to the central computer system 301 via known methods including but not limited to RF transmission, cellular transmission, satellite transmission, etc. In some embodiments, the communication interface 251 is a plug-and-play type card or other type of memory card having an associated interface processor 252 and interface memory. The interface processor 252 may execute preprogramed application software stored within the interface memory for measuring a physical quantity and communicating such data to the central computer system 301 and/or the server 320 via one or more communications networks. Also, such data may be communicated to the control panel 305 of the forklift 100 and/or one or more other localized data servers in addition to or in lieu of the foregoing. The communication interface 251 may include additional known hardware, for example an antenna, RF transmission means, modem, telephone connectors, Ethernet connectors, broadband connections, DSL connections, etc. for transmitting the position and other data.

Various types of sensors may be incorporated within the smart fork system 300. Thus, the sensors 250, 350 may be configured to measure various different parameters or conditions, or various combinations of different parameters or conditions, of the forklift 100. While the smart fork system 300 is described with reference to a pair of sensors (250, 350), it will be appreciated that more or less than two sensors may be utilized without departing from the present disclosure. Thus, one or more additional sensors may be incorporated in the smart fork system 300 to measure one or more additional parameters or combinations of parameters. The sensors 250, 350 may monitor various facets of the forklift 100, such as the tines 200, the mast 104, the frame 102, the carriage 105, the counterweight 106, the overhead guard 107, the cab 108, the power source (engine or batteries), etc.

By way of non-limiting example, the sensors 250, 350 may include a gravity sensor, an accelerometer, a gyroscope, a tilt sensor, a Global Positioning System (GPS) sensor, a position sensor, a proximity sensor, a vibration sensor, a shock and impact sensor, a velocity or speed sensor, a weight or load sensor, a sensor configured to detect one or more motions (and/or orientation) associated with a component of the forklift 100, and/or any combination thereof. In some embodiments, the sensors 250, 350 may include an image sensor, an object detection sensor, and/or a camera. In some embodiments, the sensors 250, 350 may include one or more sensors configured to measure ambient environment conditions, such as temperature, humidity, luminosity, atmospheric pressure, etc. In some embodiments, one or more of the sensors are configured as a switch (or integrated with a switch) to activate or deactivate a circuit or device to thereby control one or more functionalities of the forklift 100 based on parameters monitored by the sensors.

A gravity sensor is a motion sensor that is configured to measure an orientation with respect to the direction of gravity. The gravity sensor enables the determination of the direction of gravity relative to the sensor, for example, on calculated three-dimensional vectors. The gravity sensor may indicate an orientation, such as a degree of rotation with respect to the direction of gravity of the tine 200, e.g., when tilted.

An accelerometer is a sensor configured to detect a change in velocity during a time period, i.e., an acceleration. A three-axis accelerometer may include multiple motion sensors positioned in the x, y, and z-axis directions. The central computer system 301 may receive accelerometer values measured in the multi-axis directions as vector values. The central computer system 301 may then determine a direction in which the mast 104 and/or the tine 200 is rotated or tilted based on values obtained with respect to the three axes. An accelerometer may also be configured to measure impact or shock, i.e., when a tine 200 strikes a load. Thus, an accelerometer may be configured to measure impact or shock, as well as proper acceleration. Shock and impact sensors are configured to detect instances of sudden impact or severe vibration in order to output a value or, in the case of impact switches, activate or deactivate a circuit or device.

A gyroscope is a sensor configured to calculate an angle to which the attached component rotates with respect to an axis. This may be represented as a numerical value. A three-axis gyroscope calculates the degree to which the component rotates with respect to three axes.

An image sensor is a sensor configured to capture visual data. Generally, image sensors are embodied as a camera and can capture objects and determine position, rotation, and the like with respect to captured objects.

In some embodiments, the sensor 250 is configured to measure impact or shock, e.g., when the tine 200 strikes a portion of a pallet or some other obstacle. Thus, the sensor 250 may be a shock and impact sensor configured to detect instances of sudden impact or severe vibration. The data collected by the sensor 250 and the central computer system 301 could be shared with the industry to make a healthier environment by reducing waste due to forklift operation abuse. The data collected may also be shared with OSHA to understand forklift habits during a material handling process. In some embodiments, the sensor 250 is configured as a shock and impact sensor switch that deactivates or activates at least some functionality of the forklift 100 upon sensing impact. In some embodiments, the central computer system 301 is configured to deactivate or activate at least some functionality of the forklift 100 upon receiving data from the sensor 250 indicative of an impact occurrence. The central computer system 301 and/or the server 320 may govern operation of the tines 200 and/or the forklift 100 after determining that an impact has occurred. For example, further forward extension (reach) of the tines 200 or forward movement of the forklift 100 may be inhibited upon sensing that the tine 200 has impacted a pallet or obstacle; and/or operator notifications or alarms may be sounded or initiated upon sensing impact; and/or an instruction sequence may be communicated to the operator upon sensing impact; and/or impact notification may be sent to some central monitoring station in charge of the various operators. The data thus collected and recorded may be used for various purposes, for example, including but not limited to (a) statistical analysis to compare impacts versus locations versus operators to enhance driver training, to flag non-conformance, to improve operational safety efficiency, environment and process design, (b) to be used in any safety or quality investigation, or (c) to be available to outside agencies or insurance providers to show enhanced compliance and to lower insurance rates.

In some embodiments, the sensors 250, 350 are configured to calculate a speed of either the tine 200 and/or the forklift 100. In combination with the sensor 250, 350 also determining a location of the forklift 100 within a workspace 351, the central computer system 301 and/or the server 320, may govern the speed of the forklift 100 in predetermined zones. For example, within workspace 351 are zones 352 and 353. Zone 353 may be a high foot traffic area and as such, the speed at which a forklift 100 may travel within that zone may be limited, e.g., to 3 miles per hour. When the forklift 100 travels and crosses into zone 352, the sensors 250, 350 detect a change in location and no longer restrict the speed of the forklift 100 to 3 miles per hour. Equally, specific corners, congested areas, cross traffic areas such as intersections, entrances, or exits can also have specific speed restrictions, and the equipment may also govern the speed appropriate to a novice operator, versus an experienced operator, as prescribed by the trainer. In some embodiments, the workspace zones 352, 353 may be defined by geofencing, i.e., a virtual perimeter for a real-world geographic area. A location-aware sensor may be triggered when it enters or exits a predefined geo-fence. Thus, the smart fork system 300 may control operation of the forklift 100 and/or its components based on a location of the forklift 100.

In particular, the central computer system 301 and/or the server 320 may control operation of the mast 104, the tines 200, and/or the forklift 100 based on which workspace zone 352, 353 the forklift 100 is currently operating in. In some examples, one or more functions of the forklift 100 (e.g., the motor, the mast 104 and/or the tines 200 thereof) may be activated or deactivated when the forklift 100 enters into a particular zone (e.g., the zone 352). For example, when the forklift 100 is determined to be in the (high foot traffic) zone 353, the central computer system 301 and/or the server 320 may inhibit travel of the forklift 100 unless the tines 200 are safely positioned and oriented (e.g., where the tines 200 are in a lowered position proximate to the ground and/or where the tines 200 are sufficiently high or low to ensure an unobstructed field of view for the operator), and/or unless the mast 104 is safely tilted at an orientation appropriate for the particular zone. In some examples, the central computer system 301 and/or the server 320 may automatically position (move) the mast 104 and/or the tines 200 (or automatically alert/notify the operator to position (move) the same) upon determining that the forklift 100 has crossed into a new zone (e.g., the mast 104 and/or the tines 200 may be automatically moved into a "pedestrian safe" position when the forklift 100 is determined to be in the zone 353). In some examples, the forklift 100 is inhibited from entering one or more certain zones if the load carried (supported) by the tines 200 exceeds a certain predetermined threshold weight, and/or if the load carried (supported) by the tines 200 is raised (vertically positioned) above a certain predetermined threshold height, and/or if the mast 104 is tilting the load at a tilt angle that is outside of a certain predetermined range of tilt angles. For example, the central computer system 301 and/or the server 320 inhibit the forklift 100 from entering the zone 353 if it determines that the tines 200 are carrying a load that weighs too much for safe operation in the zone 353, that is vertically positioned too high for safe operation in the zone 353, and/or that is tilted at an unsafe tilt angle for safe operation in the zone 353. As mentioned above, the central computer system 301 and/or the server 320 may automatically position (move) the tines 200 supporting the load to a vertical position that is deemed safe for the zone 353 and/or automatically tilt the mast 104 to a safe tilt angle upon determining that the forklift 100 is entering into the zone 353 (or the central computer system 301 and/or the server 320 may automatically alert/notify the operator to re-position and/or tilt the load on the tines 200 to a safe vertical position and/or safe tilt angle). The equipment will also slow or stop if it detects the load is too high to pass under an obstruction and/or if it senses the lateral forces on the load are too great for the speed and turn angle of the equipment, and/or if it senses a sudden slippery or hazardous area marked with a sensor embedded sign by maintenance or emergency response teams.

The sensors 250, 350 and central computer system 301 may communicate with a locating system such as a Real Time Locating Service (RTLS). The locating system may be implemented on a suitable electronic processing device such as a computer associated with the server 320 or the central computer system 301. The computer of the server 320 and central computer system 301 are configured to read and execute instructions stored on the non-transitory storage medium 307, 327 for implementing the RTLS to determine the current location of the forklift 100. The server 320 may comprise a single server computer, a plurality of server computers, an ad hoc collection of network-based computers defining a cloud computing resource, etc., and/or combinations of the same. By way of non-limiting illustration, some examples of RTLS technologies include radio frequency identification based, or RFID-based, RTLS employing RFID tags disposed on or in tracked equipment; GPS-based tracking using GPS receivers (sensors) mounted to the forklift 100; WiFi based positioning (WPS) leveraging signal strength of WiFi access point (AP) connections with WiFi-enabled mobile devices; various combinations thereof; or so forth. In some embodiments, using Internet and/or other computer system(s), the current location of the portable device can be established by associating a geographic location with an Internet Protocol (IP) address, media access control (MAC) address, RFID, hardware embedded article/production number, embedded software numbers, Wi-Fi connection location, or device GPS coordinates. The location can be facilitated by automatically looking up an IP address on a WHOIS service and retrieving the registrant's physical address. In some examples, other mobile and/or semi-permanent sensors may be utilized which are allocated to Health and Safety, Emergency Response Teams, Hazmat Teams and Plant Maintenance Teams to provide real time risk avoidance strategy for the equipment and operators.

As mentioned, in some embodiments, the central computer system 301 (and/or the server 320) is interconnected to the tilt controls of the control panel 305 to ensure that a load is properly positioned on the tines 110, 200 and safely stabilized by tilting the mast 104. Data measured by the sensors 250, 350 ensure compliance with OSHA requirements and may be recorded and stored in the storage medium 307, 327. In these embodiments, sensors 250, 350 may be located in the horizontal and vertical position of the forklift 100. The sensors 250, 350 are configured to measure the position of a load of the tines 110, 200. Specifically, the sensors 250, 350 and computer system 301 (and/or the server 320) are configured to determine when the load is positioned as rearward as possible on the tines 110, 200, close to the carriage 105, and whether the tines 110, 200 are sufficiently tilting the load (e.g., by the operator tilting the mast 104). Thus, the smart fork system 300 will be able to determine a forklift operator's compliance with various OSHA requirements, such as OSHA requirement 1910.170 (o)(5) which provides that "[a] load engaging means shall be placed under the load as far as possible; the mast shall be carefully tilted backward to stabilize the load." Various sensors may be utilized, such as proximity sensors, tilt sensors, optical sensors, and/or force sensors.

In some embodiments, the central computer system 301 (and/or the server 320) may monitor the speed at which the operator tilts the mast 104 when the tines 110, 200 are loaded to ensure that the operator is carefully tilting the load per OSHA requirements. For example, a safe tilt speed may be ascertained and programmed into the central computer system 301 (and/or the server 320), and the central computer system 301 (and/or the server 320) may inhibit tilting the mast 104 (when loaded or unloaded) at speeds exceeding the ascertained safe tilt speed and/or provide notification to the operator that they are exceeding safe tilt speed limits.

In some embodiments, the sensors 250, 350 are utilized to ensure that the load is fully stable (i.e., longitudinally, laterally, and dynamically stable pursuant to OSHA regulations Appendix A of Section 1910.178). Upon determination that the forklift 100 is approaching unstable levels, the central computer system 301 (and/or the sever 320) is configured to issue warnings and/or disable certain functions of the forklift 100. Various sensors may be utilized, such as proximity sensors, tilt sensors, optical sensors, and/or force sensors. A determination of the stability of a forklift 100 carrying a load is calculated based on the forklift's wheelbase or track, as well as the weight and location of the load and the forklift's counter weight location. The wheelbase and track are constants, the values of which may be stored in the non-transitory storage medium 307, 327 of the computer system 301 and/or the server 320.

In some embodiments, the forklift 100 is equipped with a weight sensor or scale in communication with the central computer system 301 (and/or the server 320) configured to measure the weight of the load carried by the forklift 100. For example, sensors in a hydraulic system of the forklift 100 may measure resistance to whatever object/load the forklift 100 is lifting, thus determining the weight of the object/load. However, it is to be appreciated that other systems known in the art for measuring the loads while on or off the forklift may be substituted therein without departing from the scope of the present disclosure. In some examples, the weight sensor may also communicate to the processor where the load was left to ensure it does not exceed weight restrictions of vertical racks, mezzanine or trailer.

Whether a load is stable depends on the moment of inertia of the load at one end of a system being greater than, equal to, or smaller than the object's moment at the system's other end. This principle can be seen in the way a seesaw or teeter-totter works: that is, if the product of the load and distance from the fulcrum (moment) is equal to the moment at the forklift's other end, the forklift is balanced and it will not move. However, if there is a greater moment at one end of the forklift, the forklift will try to move downward at the end with the greater moment.

The longitudinal stability of a counterbalanced forklift 100 depends on the forklift's moment and the moment of the load. In other words, if the mathematic product of the distance from the front wheels to the load's center of mass times the weight of the load is less than the moment of the forklift, the system is balanced and will not tip forward. However, if the moment of the load is greater than the moment of the forklift 100, the greater moment of the load will force the forklift 100 to tip forward. To ensure that longitudinal stability is met, the sensors 250, 350 may be configured to measure the distance of the load from the wheels of the forklift 100. For example, one or more sensors (e.g., the sensor 350) may be positioned on the shank 202, the carriage 105, and/or the frame 102 such that the sensor(s) can accurately measure the approximate distance of a load from the wheelbase. This collected position data is transmitted to the central computer system 301 (and/or the server 320), which utilizes such position data in combination with the determined or known weight of the load, to calculate the moment of the load. The moment of the load is compared to the known moment of the forklift 100 in order to determine the forklift's 100 propensity for tipping forward. The computer system 301 (and/or the server 320) may be configured to generate a warning to the operator (and/or other locally or remotely located persons) and/or disable functions based on the determined moment of the load.

Figure 4:
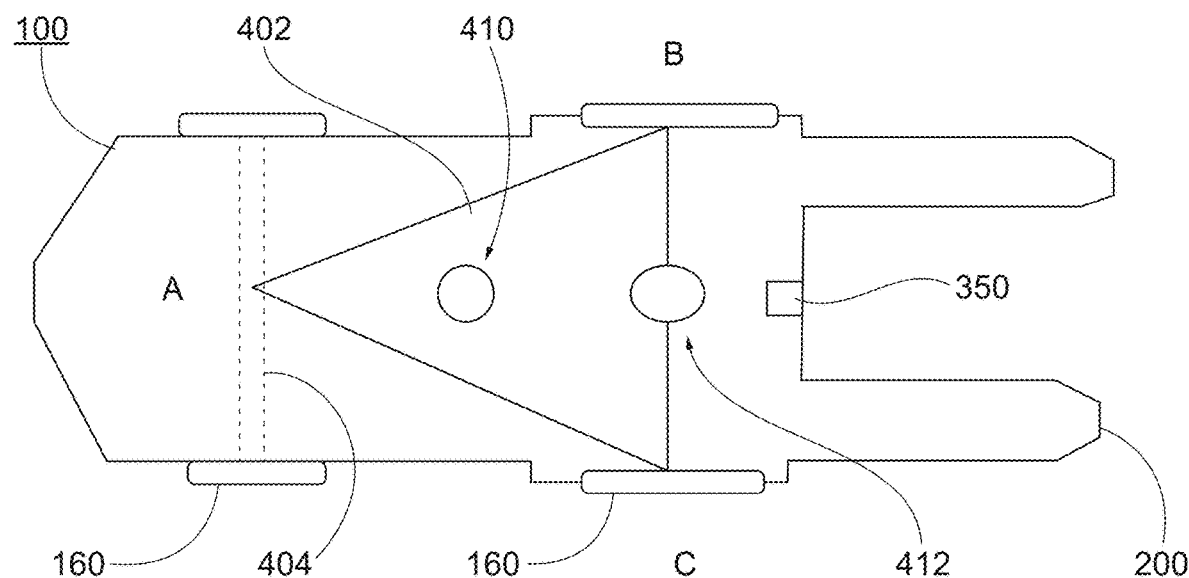
FIG. 4 illustrates the stability triangle of a forklift vehicle.

The sensors 250, 350 and computer system 301 may also be configured to determine whether the center of mass of a loaded forklift 100 is within the stability triangle 402. With reference to FIG. 4, a counterbalanced forklift may have a three-point suspension system, that is, the forklift 100 may be supported at three points A, B, and C. This may be true even if the forklift 100 has four wheels 160. The forklift steer axle 404 is attached to the forklift 100 by a pivot pin in the steer axle's 404 center about the point A. Connecting the points A, B, and C, with imaginary lines defines a triangle representative of the forklift's 100 three-point support called the stability triangle 402. The forklift 100 has a load center, which is represented in FIG. 4 by a center of mass point 410. The position of the center of mass point 410 relative to the forklift 100 will change/move depending on whether the tines 200 are supporting a load and how that load is oriented. Thus, the center of mass point 410 may be representative of the forklift's 100 load center, regardless of whether the forklift 100 is loaded or unloaded, except that it may be located in a different position relative to the forklift 100 than as illustrated in FIG. 4 depending on the magnitude and/or orientation of the particular load.

When the forklift's 100 load center (i.e., the center of mass point 410) is located within the stability triangle 402, the forklift 100 is stable and will not tip over. However, when the vehicle/load combination center of mass falls outside the stability triangle 402, for example beyond a point 412, the forklift 100 becomes unstable and may tip over. Like determining the longitudinal stability described above, the sensors 250, 350 are configured to measure the distance and weight of the load. Combined with known quantities such as the forklift's 100 weight properties and dimensions (stored and accessible via the storage medium 307, 327), the computer system 301 (and/or the server 320) may determine whether the loaded center of mass point 410 is within the boundaries of the stability triangle 402.

Figure 5A:
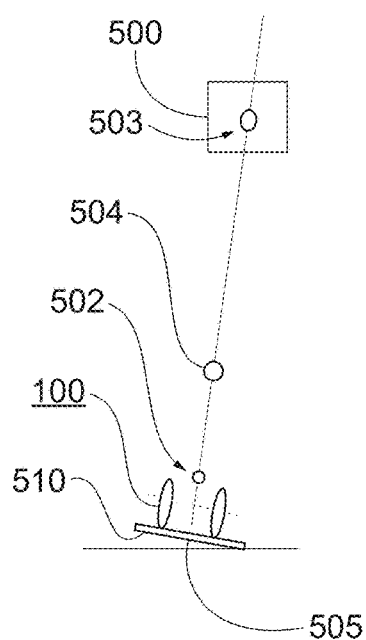
FIG. 5A illustrates a laterally stable forklift vehicle.
Figure 5B:
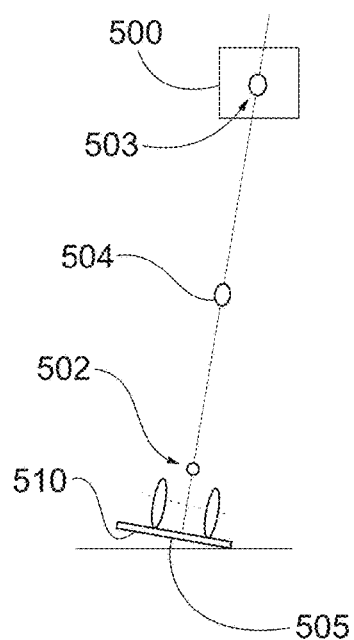
FIG. 5B illustrates a laterally unstable forklift vehicle.

The sensors 250, 350 and computer system 301 (and/or the server 320) may also be configured to determine the lateral stability of the forklift 100. With reference to FIGS. 5A and 5B, the lateral stability of a forklift 100 may be determined by the position of a "line of action" 512, wherein the line of action 512 is a vertical line that passes through the combined forklift 100 and load's center of mass. That is, the forklift 100 has a forklift center of mass 502 and the load 500 has a load center of mass 503, and a combined center of mass 504 may be calculated that accounts for both the forklift center of mass 502 and the load center of mass 503, and the combined center of mass 504 is located between forklift center of mass 502 and the load center of mass 503. When the forklift 100 is not loaded, the location of the forklift center of mass 502 is the only factor to be considered in determining the stability of the forklift 100. As long as the line of action 512 of the combined center of mass 504 is located within the stability triangle 402 described above, the forklift 100 as illustrated in FIG. 5A is stable and will not tip over. However, if the "line of action" 512 falls outside the stability triangle 402 as illustrated in FIG. 5B, the forklift 100 is not stable and may tip over. Factors that lead to the lateral stability of the forklift 100 may include the placement of the load 500 on the forklift 100, the height of the load 500 above the surface 510 on which the forklift 100 is operation, and the forklift's degree of lean 505.

The sensors 250, 350 and computer system 301 may also be configured to determine the dynamic stability of the forklift 100. Up to this point, the stability of a forklift 100 has been discussed without considering the dynamic forces that result when the forklift 100 and load are put into motion. The weight's transfer and the resultant shift in the center of mass due to the dynamic forces created when the machine is moving, braking, cornering, lifting, tilting, and lowering loads, etc., are important stability considerations. When determining whether a load can be safely handled, the operator should exercise extra caution when handling loads that cause the forklift 100 to approach its maximum design characteristics. For example, if an operator is to handle a maximum load, the load should be carried at the lowest position possible, the forklift 100 should be accelerated slowly and evenly, and the forks or tines 200 should be tilted forward cautiously. However, no precise rules may be formulated to cover all of these eventualities. The sensors 250, 350 may be configured to measure acceleration of the tines 200 and/or of the forklift 100. In combination with the known weight and weight distribution of the forklift 100 and a measured weight of the load, the dynamic forces may be calculated and warnings issued to the operator if the dynamic forces are measured above a threshold value that may cause the forklift 100 to tip. In other embodiments, the computer system 301 (and/or the server 320) restricts or limits the movement (e.g., speed, direction) of the tines 200, carriage 105, mast 104, and forklift 100 in order to prevent tipping due to calculated dynamic instabilities.

Accordingly, the smart fork system 300 may generate data regarding various operating conditions of the forklift 100 and its various components. This data is accessible in real-time and may be stored for future use. Thus, the smart fork system 300 generates data that may be utilized to monitor operator performance in the field and/or for training operators in a simulated environment. The data thus collected and recorded may be used for various purposes, such as, for example (a) statistical analysis to compare impacts versus location versus operator to enhance driver training, to flag non-conformance, to improve operational safety, efficiency, environment, and process design, (b) to be used in any safety or quality investigation, and/or (c) be available to outside agencies or insurance providers to show enhanced compliance and lower insurance rates, etc.

Operator Interface System for Powered Industrial Vehicles

Figure 6:
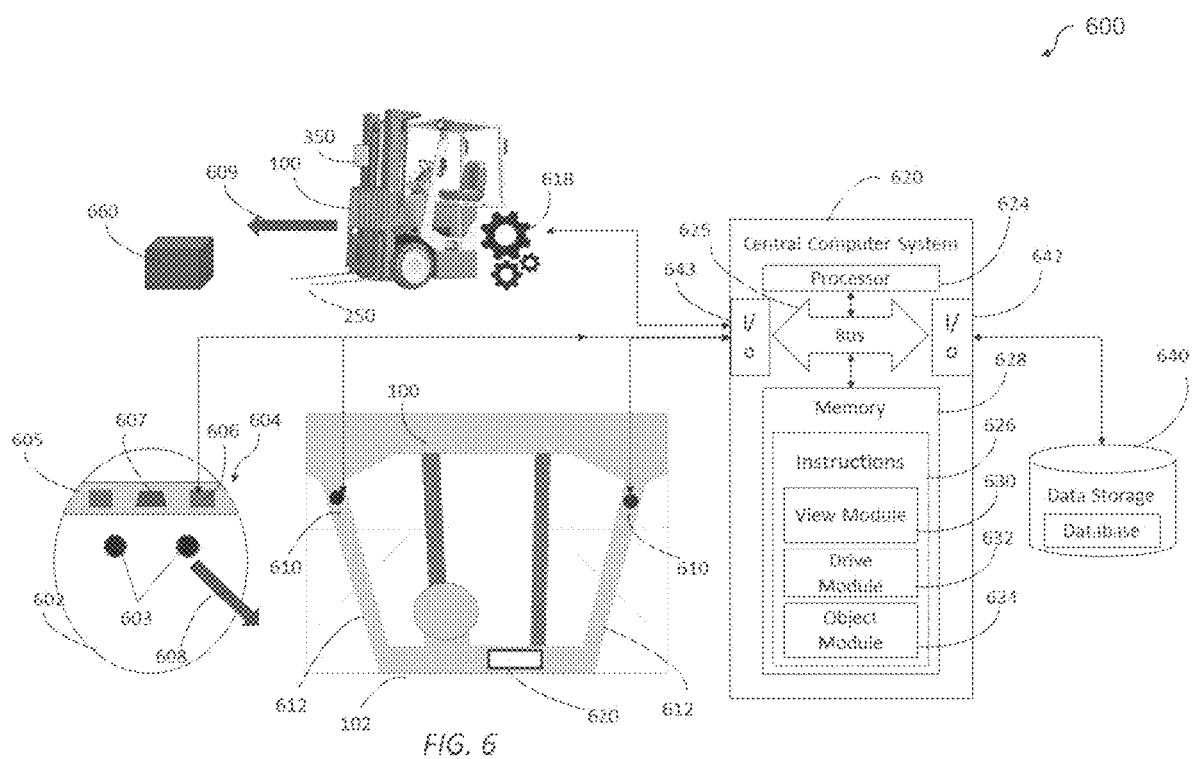
FIG. 6 is a schematic illustration of an example operator interface system in accordance with the present disclosure.

In accordance with another aspect of the present disclosure, an operator interface system for powered industrial vehicles is provided. FIG. 6 illustrates an example of an operator interface system 600 for controlling powered industrial vehicles based on the field of view of an operator 602 of the vehicle, according to one or more embodiments of the present disclosure. It will be appreciated that the various components depicted in FIG. 6 are for purposes of illustrating aspects of the example embodiment, and that other similar components, implemented via hardware, software, or a combination thereof, are capable of being substituted therein. The operator interface system 600 (hereinafter, the system 600) is configured to control the power or drivetrain of a powered industrial vehicle, e.g., the forklift 100 or other material handling equipment, based on data received from view point sensors such that the vehicle may only travel in the direction that the operator 602 is looking. Thus, the system 600 may interface with the drive train or power of the forklift 100 to permit travel in directions that are within the operator's 602 field of view. In some embodiments, the system 600 may inhibit travel of the forklift 100 in directions that do not align with or fall within the operator's 602 field of view, and/or the system 600 may provide an alert or notification to the operator 602 (and/or to other locally or remotely located persons) when the operator's 602 field of view does not correspond to the direction of travel of the forklift 100.

The system 600 may include a sensing device 604 worn by the operator 602, which may be in the form of a headband 605 or hat, and which aligns with or senses a field of vision or view of the operator 602. The position of the operator's 602 head and/or eyes 603 are indicative of the operator's 602 field of view, and may be determined by forklift mounted sensors 610 that are in communication with a central computer system 620.

In some embodiments, the sensing device 604 may include at least one sensor 606 that is recognizable by at least one sensor 610 mounted to the forklift frame 102 to thereby define a sensing perimeter around the operator 602 within the cab 108. The sensing device 604 may include one or more additional sensors for sensing other parameters or conditions, for example, ambient environment parameters or conditions and/or parameters or conditions associated with the operator 602. For example, the sensing device 604 may include sensors for monitoring weather conditions (temperature, moisture or rain, lightning, etc.) in which the forklift 100 is being operated. In some examples, the sensing device 604 may include sensors for monitoring the awareness, health, or condition of the operator 602 such as a temperature sensor, heart rate monitor, a timer tracking how long the operator 602 has been operating the forklift 100, etc.

FIG. 6 illustrates two of the sensors 610 being mounted to a pair of pillars 612 of the frame 102, however, one or more additional sensors 610 may be mounted elsewhere about the frame 102. Thus, while only two pillars 612 and mounted sensors 610 are illustrated in the front-facing view of FIG. 6, the pillars 612 at the rear of the forklift 100 may also include sensors 610. That is, a forklift 100 may have three or more pillars 612 surrounding the cab 108, which may have sensors 610 for recognizing a position of the headband sensors 606. Also, the sensors 610 may be mounted at different portions of the frame 102 (i.e., not the pillars 612). Thus, the system 600 may include more or less than two sensors 610, which may be mounted to the pillars 612 of the frame 102 and/or at various other portions of the frame 102.

In other embodiments, the sensing device 604 includes a unique pattern or marker 607, which is recognized by the sensors 610. For example, sensors 610 may be image sensors configured to view the unique markers 607 on the headband 605. Based on the positioning of the unique marker 607 within the field of view of the image sensors 610, the central computer system 620 may calculate the rotation position of the operator's 602 head.

In yet still other embodiments, a sensing device 604 does not need to be worn by an operator 602. Rather, the sensors 610 may be configured to detect and track the movement of the operator's eyes 603. Based on the positioning of the eyes 603 within the field of view of the image sensors 610, the central computer system 620 may calculate the rotation position of the operator's 602 head.

As shown in FIG. 6 and as described above, the system 600 includes a central control system that interfaces with a drive train 618 and/or power systems of the forklift 100, and which is represented generally as the central computer system 620 that is capable of implementing the example method described below. The central computer system 620 may be variously embodied without departing from the scope of the present disclosure as an industrial computer, personal computer, tablet, smartphone or other known device that hosts a software platform and/or application. The example central computer system 620 includes a processor 624, which performs the example method by execution of processing instructions 626 that are stored in memory 628 connected to the processor 624, as well as controlling the overall operation of the central computer system 620.

The central computer system 620 may also include a user interface similar to the user interface 304 of central computer system 301 for monitoring and controlling the various components of forklift 100. The central computer system 620 is in electronic communication with the sensors 610 and is configured to receive (wired or wirelessly) data measured by the sensors 610 that relate to the position of the operator's 602 head while wearing the sensing device 604 or is configured to track the operator's eyes 603.

The instructions 626 include a viewpoint module 630 configured to receive data from one of or both the forklift mounted sensors 610 or sensors 606 worn by the operator. The viewpoint module 630 utilizes the sensor data to determine the orientation of the operator's 602 head (and/or eyes 603) and associates the operator with field of view direction 608.

The instructions 626 also include a drive module 632 that, when implemented by the processor 624, controls the power systems and/or or drivetrain 618 of the forklift 100. That is, the drive module 632 is configured to determine a direction of travel 609 of the forklift 100. For example, if the control (e.g., steering wheel, joystick, steering bars, etc.) is manipulated such that the forklift 100 is configured to make a left turn, the drive module 632 in communication with the drivetrain 618 determines the direction of travel 609 corresponding with such a left turn. The drive module 632 is also configured to control at least one of the components of the forklift 100 that deliver power to the driving wheels. The drive module 632 receives the field of view direction 608 from the viewpoint module 360 and compares the view direction 608 to the determined direction of travel 609. If the view direction 608 and direction of travel 609 are in substantial alignment, the drive module 632 allows the forklift 100 to travel in the shared direction. However, if the view direction 608 does not align (correspond) with the determined direction of travel 609, e.g., the operator is looking away from the direction of travel 609, then the drive module 632 controls the drivetrain 618 such that the forklift 100 is restricted from traveling in the direction of travel 609. Accordingly, the system 600 interfaces with the forklift 100 to control or override the power or the drivetrain 618 of the forklift 100 such that the vehicle may only be driven in a direction that aligns with the actual vision or view of the operator 602 in real time. For example, optical or proximity sensors arrayed around the fork operator cage and on the operator may be used to ensure the operator is looking in the direction of travel.

The various components of the computer system 620 may all be connected by a data/control bus 625. The processor 624 of the computer system 620 is in communication with an associated data storage 640 via a link 642 and is in communication with the sensor systems (e.g., with comprising sensors 606, 610, 250, 350) and drivetrain 618 via link 643. A suitable communications link 642, 643 may include, for example, the public switched telephone network, a proprietary communications network, infrared, optical, or other suitable wired or wireless data communications.

In some embodiments, the system 600 may include sensors, such as sensors 250, 350, 606, 610 or recognition capabilities that detect when there is an obstruction 660 in the operator's view or in the path of the forklift 100 and provide alert/notification of the same. That is, an object module 634 is configured to receive sensor data regarding the environment of the forklift 100 and determine the presence of an obstruction 660 in a particular direction. If the obstruction 660 is in the direction of travel 609 the object module 634 and drive module 632 cooperate to provide an alert or restrict movement of the forklift 100 in that direction to avoid the obstruction 660. The system 600 may require the operator 602 to manually override such an alert to continue traveling in the direction of the obstruction 660 or to continue traveling with an obstructed view. The system 600 may also provide notification of the same to other locally or remotely located persons.

The computer system 620 may also include an associated data storage 640 that corresponds to any organized collection of data used for one or more purposes. Implementation of the associated data storage 640 is capable of occurring on any mass storage device(s), for example, magnetic storage drives, a hard disk drive, optical storage devices, flash memory devices, or a suitable combination thereof. The associated data storage 640 may be implemented as a component of the computer system 620, e.g., resident in memory 628, or the like. The system 600 may then save data obtained during operation in a database 644 which may be utilized by training or safety personnel to ensure safe/correct operation of the vehicle 100.

The system 600 may also include some safety features alerting training or safety personnel that a vehicle operator may need additional training if the power to the vehicle was disabled a predetermined number of times due to the operator not looking in the direction of the vehicle's travel and/or if the operator drove with obstructed vision or through an obstructed path too many times. In addition, the system may completely inhibit operation of the vehicle if the operator is not wearing the sensing device 604 unless overridden by safety/training personnel. The data thus collected and recorded may be used for a variety of purposes, for example, (a) statistical analysis to compare impacts versus location versus operator to enhance driver training, to flag nonconformance, to improve operational safety efficiency, environment and process design, (b) to grade operators for bonus or other remuneration based on performance, (c) to be used in any safety or quality investigation, (d) to be available to outside agencies or insurance providers to show enhanced compliance and to lower insurance rates, and/or (e) to show customers, owners or stockholders data regarding the safe handling of their product which may command higher fees or provide a competitive advantage, etc.

Integrated Control System for Powered Industrial Vehicles

Figure 7:
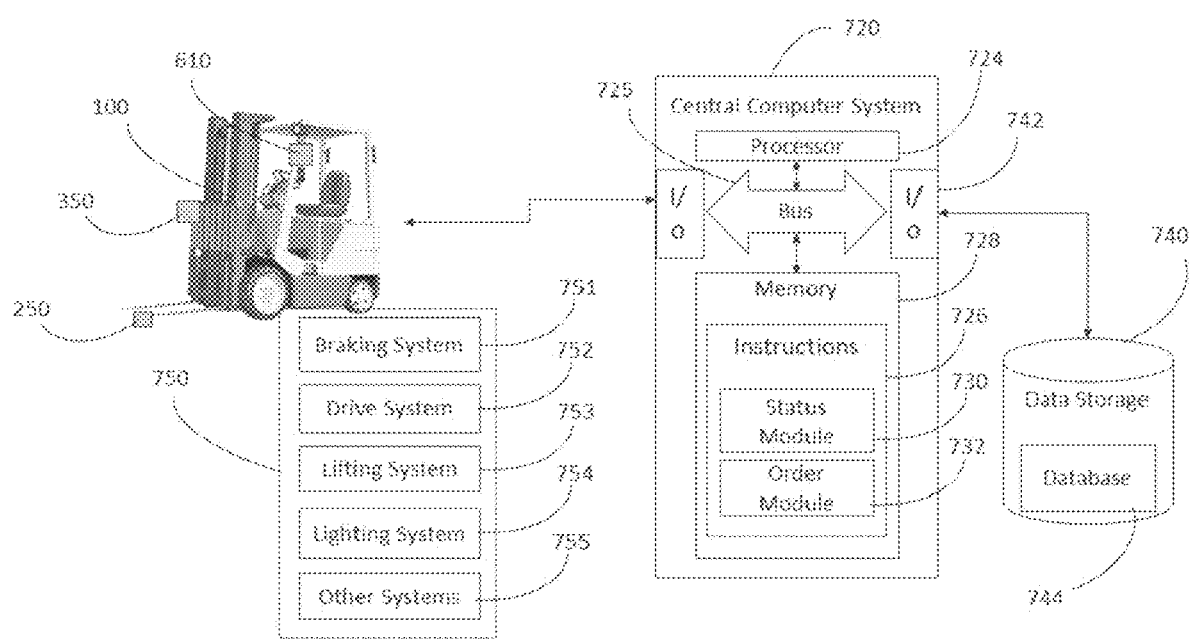
FIG. 7 is a schematic illustration of an example operator interface system in accordance with the present disclosure.

In accordance with another aspect of the present disclosure and with reference to FIG. 7, an integrated control system 700 for powered industrial vehicles is provided. Generally, the integrated control system 700 (hereinafter, the system 700) controls the industrial vehicle (e.g., the forklift 100) such that the operator cannot perform a certain operation without first performing a different, prior operation first and/or such that the operator cannot perform two or more operations simultaneously which would result in unsafe operation.

The system 700 includes a central computer system 720, which is capable of implementing the example method described below. The central computer system 720 is similar in some aspects to computer system 620 and may be best understood with reference thereto, having similar components, e.g., a processor 724 configured for processing instructions 726 that are stored in memory 728.

The instructions 726 include a status module 730 that, when implemented by the processor 724, determines a status of all of the operational systems 750 of the vehicle 100.

Operational systems 750 include, but are not limited to, a braking system 751 (for stopping and slowing down the vehicle), a drive system 752 (for steering and moving the vehicle), a lifting system 753 (for manipulating the tines, carriage, and mast) a lighting system 754 (for controlling lights on the vehicle) and other system 755 for controlling other features that may be integrated into the vehicle. As a non-limiting example, the status module 730 is configured to determine whether the brakes of the braking system 751 are engaged (e.g., via the operator pressing a brake pedal or the like). As another non-limiting example, the status module 730 may also (or instead) be able to determine whether the throttle of the drive system 752 is being applied and moving the vehicle forward, in reverse, or in a direction. As another non-limiting example, the status module 730 may also be able to determine whether the lifting system 753 is actively translating a load up or down the mast 104 and if the mast 104 is in a tilted position.

In some embodiments, the status module 730 is configured to receive data from sensors 250, 350, 610 mounted to various locations of the forklift 100 and/or from one or more sensors 606 worn by the operator 602, as described in greater detail above. The sensor data aids the status module 730 in determining a status of an operational system 750. For example and without limitation, the sensors may detect positions of the forklift 100, the mast 104, the carriage 105, and/or the tines 200, the presence of a load on the tines 200, the speed of the forklift 100, and/or the direction the operator 602 is looking.

The instructions 726 also include an order module 732 that, when implemented by the processor 724, controls the operation of one of the operational systems 750 based on a determined status of one or more components of the same operational system or other operational system 750. The order module 732 restricts a desired movement of the forklift 100 until a first operation is performed. The order of operational functions may be stored in a database 744 on the data storage device 740 that is accessible from the processor 724 via data link 742. For example and without limitation, the order module 732 may restrict movement of the lifting system 753 until the status module 730 detects that the brake pedal of the braking system 751 is first engaged. In other words, the lifting system 753 and braking system 751 are integrated such that the operation of one depends on the other. In another non-limiting example, the lifting system 753 is dependent on the status of the drive system 752, such that if the throttle of the drive system 752 is engaged, the order module 732 restricts movement of the lifting system 753 and vice versa.

The system 700 may thus create a controlled environment for the operator to operate the vehicle 100, and the controlled environment by which the user may operate the vehicle may be based on OSHA standards/rules. The system 700 may also provide feedback to the operator based on their performance which is stored in the data storage 740. That is, the system 700 may also save data obtained during operation in a database 744, which may be utilized by training or safety personnel to ensure safe/correct operation of the vehicle.

VR Simulator for Powered Industrial Vehicles

Embodiments of the present disclosure are also directed towards a material handling equipment simulator utilizable for training purposes. While the above embodiments are described with reference to use with the forklift 100 (or other material handling equipment), they may also be embodied within a simulator. Such simulator may be utilized for training purposes, for example, in a classroom setting when accrediting and teaching potential operators as to safe operation of the forklift 100. The simulator may be utilized by organizations and institutions for accrediting and certifying potential operators in accordance with applicable standards and/or regulations. Also, the simulator may be utilized by companies desiring to train their equipment operators in accordance with their own company specific rules or regulations regarding use of the material handling equipment that may be even more stringent than more general industry-wide standards. Thus, the simulator may be utilized for skill development, skill testing and proof of training, re-training, proficiency certification or re-certification.

The simulator may be run on various types of computer systems and/or gaming platforms, such as a virtual reality (VR) console. The simulator system replicates material handling equipment, devices, operator movement and virtual device or equipment movement in a virtual environment. The virtual world may closely simulate the required ideal or non-ideal environment, equipment and operations the operator will experience during actual use in the field. The simulator system can be programmed with virtual paths, routes and associated activity prior to a facility or line actually being built.

The simulator system may be utilized in the design and planning of a new facility and its equipment. In this manner, the simulator system may be utilized to perform efficiency, safety, and time studies prior to the facility or equipment being created ordered or installed. For example, safety or delivery flaws in the simulated environment may be found prior to ordering facility equipment and/or facility construction. Also, efficiencies of the new facility, equipment layouts, and/or incorporation of proposed facility equipment or devices may be checked prior to ordering and construction.

Operators may use the simulator system to train virtually in the new environment prior to actually operating equipment in the new environment to increase accuracy and efficiency. Non-operators may also use the simulator system to enhance their understanding of working safely around the material handling equipment.

Hazards and hazardous conditions may be introduced in the virtual environment to capture actual driving and material handling characteristics against an ideal or acceptable result. Hazards and hazardous conditions may include, without limitation, pedestrians, poor loads or stacking, liquid on the operating floor, poor lighting conditions, poor weather conditions, etc. The results may be replayed with the correct behavior fed back to the operator. The operator can also interact with other equipment or devices, such as but not limited to scanners, displays, pens, etc.

Scores and instructional training can be maintained as test results and proof of training to third parties, such as accreditation institutions and organizations. Safety and efficiency can be improved by providing feedback to the operator regarding their actual actions in the virtual environment. For example, eye motion in the correct path of travel (as 85% of collisions are caused by not looking in the direction of travel) may be recorded and fed back to the operator. The operator may also be tested on a specific facility's rules of the road (for example, maintaining a 3-foot clearance from pedestrians etc.) by comparing ideal operation to actual operation. Also, a safety incident or specific training may be recreated in virtual reality for training of all associates instead of just giving an oral description of the safety incident or specific training.

The simulator system may capture speed, hand, body and eye movement, operating time, impacts (i.e., G-forces), dimensions of facilities and equipment, rules of the road, reaction to hazards, using virtual equipment, devices and environments that can be programmed into the system and held for data collection purposes or testing. The simulator system collects this data, which can then be used to check the level of training, ability, knowledge, safety or efficiency of the operator or operation. The data can be stored as proof of the training certification trial or efficiency of the operator in the virtual environment.

Operators may use the simulator system to practice in a virtual environment. This saves the cost of actual equipment, devices, space for training, and possible damage by inexperienced operators. Multiple operators may be trained at one time, which saves the cost of a live instruction. Operators may be exposed to hazards and learn how to safely and correctly handle them in a virtual environment, which would be too dangerous to provide actual real-life experience to them in a real (non-simulated) environment. The simulator system may record operator errors and provide feedback to the operator so they can see for themselves. The feedback may be provided instantaneously and in real time during the simulation and/or the feedback may be reported at a later time, for example, after the training simulation. The operator may then learn, witness, believe and correct their errors, which is faster and more effective than just verbally explaining the required correction to the operator as the operator will be obtaining simulated experience to learn from. The simulator system may be run again to reinforce the correction as many times as required to provide a benchmark and improvement results. The data may be stored for interested third parties as proof of training and competency. Operators may be re-certified using the simulator system to thereby save on teaching time, save on equipment space, damage and devices for corrections. Also, as mentioned above, different equipment, devices, layouts and facilities may be simulated prior to their order or construction to check safety, quality delivery locations and efficiency and material handling management systems prior to constructing the real environments. Safety, delivery and management issues may also be found and corrected, or new solutions attempted and tried prior to real environments being constructed, thereby cutting or eliminating costs associated with corrections. Experts or consultants may give feedback on the virtual environment prior to certifying final construction to save on construction or ordering delays. Operators may practice procedures in a virtual environment so they are more effective and make fewer errors when they enter the real environment, thereby saving on the cost of corrections.

The amount of virtual environments, hazards, data collection, and scenarios programmed in the simulator system are not limited and may be used for virtually any new material handling project, thereby adding versatility to the simulator system.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions are to be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A smart fork system for a human-operated powered industrial vehicle, comprising:
   a tine comprising at least one cavity, wherein a sensor is disposed within the at least one cavity, the sensor configured to detect a condition; and
   a processor communicatively coupled to the sensor, wherein the processor is to:
      receive data from the sensor corresponding to the detected condition;
      determine, based on the data, that an impact has occurred; and
      in response to the determination of the impact, control at least one operation of the powered industrial vehicle by controlling a switch, wherein the switch is configured to deactivate a circuit or device inhibiting a movement of the powered industrial vehicle directed by a human operator.

2. The smart fork system of claim 1, wherein the sensor is configured to detect one or more motions, one or more orientations, one or more impacts, one or more environmental conditions, or a combination thereof.

3. The smart fork system of claim 1, wherein the processor is further configured to:
   control a forward extension of the tine, a forward movement of the powered industrial vehicle, an alarm, a communication, or a combination thereof.

4. The smart fork system of claim 1, wherein the sensor is a first sensor and the data is a first set of data, the smart fork system further comprising a second sensor coupled to a second component of the smart fork system and communicatively coupled to the processor, and wherein the processor is further configured to:
   receive a second set of data from the second sensor; and
   store the first set of data of the first sensor and the second set of data of the second sensor to a storage device.

5. The smart fork system of claim 4, wherein the processor is configured to:
   determine, based on the first set of data, the second set of data, or a combination thereof, a location of the powered industrial vehicle within an environment; and
   control, based on the location, the at least one operation of the powered industrial vehicle.

6. The smart fork system of claim 5, wherein the at least one operation is a speed of the powered industrial vehicle, a position of the tine, a forward or backward movement of the powered industrial vehicle, a tilt of a mast of the powered industrial vehicle, an alarm or communication system of the powered industrial vehicle, or a combination thereof.

7. The smart fork system of claim 4, wherein the second component is a second tine, a mast, a frame, a carriage, a counterweight, an overhead guard, a cab, a power source, or an axle.

8. The smart fork system of claim 4, wherein at least one of the first sensor or the second sensor is a gravity sensor, an accelerometer, a gyroscope, a tilt sensor, a Global Positioning System (GPS) sensor, a position sensor, a proximity sensor, a vibration sensor, a shock and impact sensor, a velocity or speed sensor, a weight or load sensor, an optical sensor, or a force sensor.

9. The smart fork system of claim 4, wherein at least one of the first sensor or the second sensor is an image sensor, an object detection sensor, or a camera.

10. The smart fork system of claim 4, wherein at least one of the first sensor or the second sensor is configured to measure a temperature, a humidity, a luminosity, or an atmospheric pressure.

* * * * *